United States Patent
Yoshizawa et al.

(10) Patent No.: US 7,082,964 B1
(45) Date of Patent: Aug. 1, 2006

(54) ATTACHMENT STRUCTURE OF A COMPONENT IN A FUEL TANK MADE OF RESIN

(75) Inventors: Yuuji Yoshizawa, Tochigi (JP); Tohru Matuzaki, Tochigi (JP); Shinya Murabayashi, Saitama (JP); Naomasa Kaneko, Saitama (JP); Akira Isayama, Saitama (JP); Tadahisa Nakamura, Saitama (JP); Toshiaki Nakai, Saitama (JP); Junichi Koseki, Saitama (JP); Shohei Yamamoto, Tochigi (JP)

(73) Assignees: Yachiyo Kogyo Kabushiki Kaisya, Saitama (JP); Honda Motor Co., Ltd., Tokyo (JP); NIFCO Inc., Kanagawa (JP)

( * ) Notice: Subject to any disclaimer, the term of this patent is extended or adjusted under 35 U.S.C. 154(b) by 0 days.

(21) Appl. No.: 11/076,546

(22) Filed: Mar. 9, 2005

(51) Int. Cl.
    *F17D 1/00* (2006.01)
    *F16K 21/04* (2006.01)

(52) U.S. Cl. .................. 137/592; 137/543; 251/368

(58) Field of Classification Search .......... 137/542, 137/543, 592; 251/368
See application file for complete search history.

(56) References Cited

U.S. PATENT DOCUMENTS

| | | | |
|---|---|---|---|
| 6,240,957 B1 * | 6/2001 | Hattori | 137/527.6 |
| 2001/0013367 A1 | 8/2001 | Miura et al. | |
| 2002/0159825 A1 | 10/2002 | Ito et al. | |
| 2003/0015526 A1 | 1/2003 | Nakaya et al. | |

FOREIGN PATENT DOCUMENTS

| | | |
|---|---|---|
| GB | 2 368 111 | 2/2002 |
| JP | 2003-002074 | 1/2003 |
| JP | 2003-220627 | 8/2003 |
| JP | 2004-124903 | 4/2004 |

\* cited by examiner

*Primary Examiner*—A. Michael Chambers
(74) *Attorney, Agent, or Firm*—Fish & Richardson P.C.

(57) ABSTRACT

In order to solve the problem of a conventional attachment structure of a fuel tank made of resin, the present invention is an attachment structure of a component of a fuel tank made of resin where a connection portion with a tank main body made of resin is formed of a thermally depositable material, and which tank comprises a joint portion connected with the tank main body by a thermal deposition and an inner tubular member supported by the joint portion and housed in the tank main body, wherein a movement regulation mechanism for regulating a movement in an axial direction of the inner tubular member for the joint portion is provided at least at one of the joint portion and the inner tubular member, and the joint portion and the inner tubular member are formed by an integral molding.

14 Claims, 4 Drawing Sheets

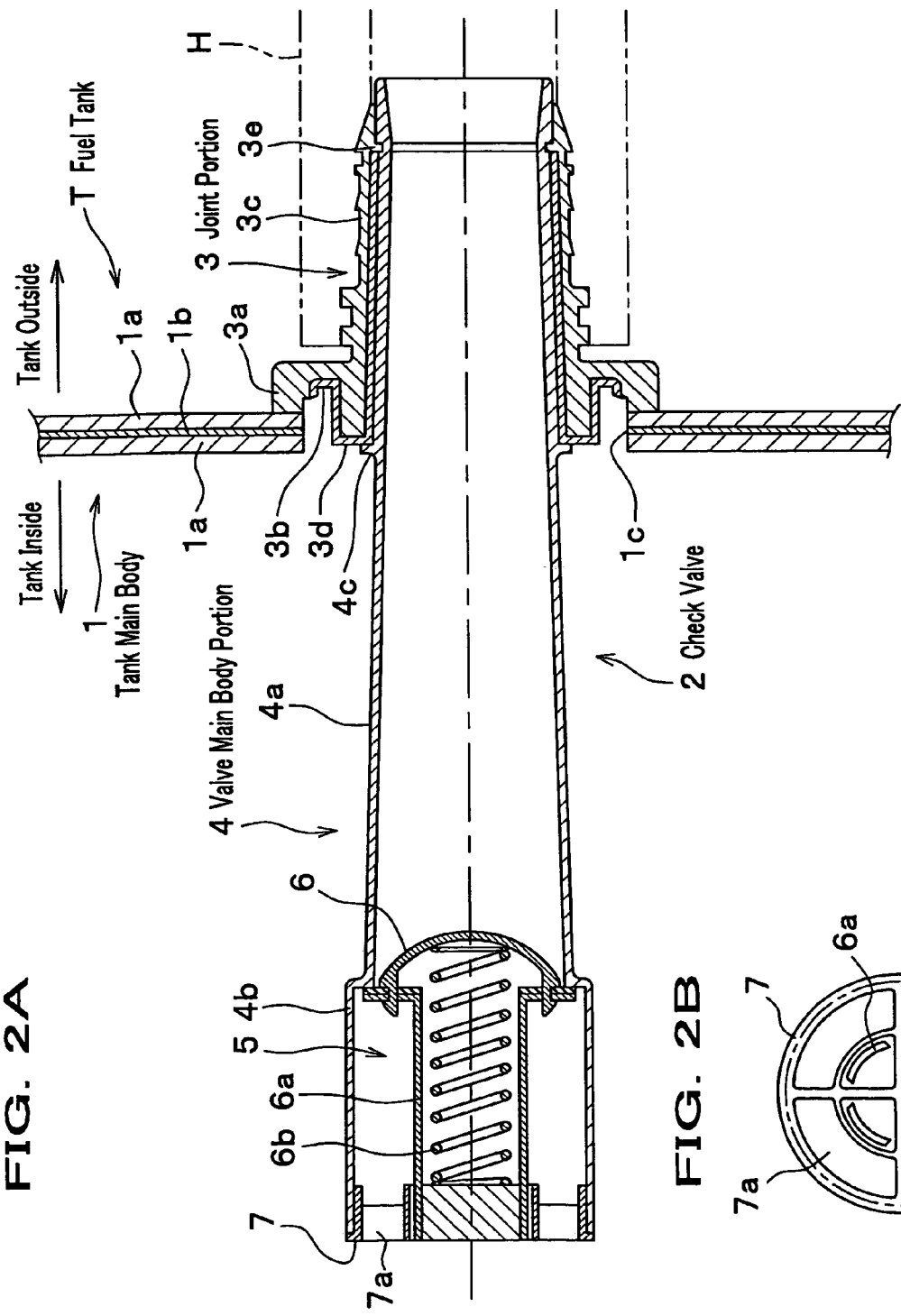
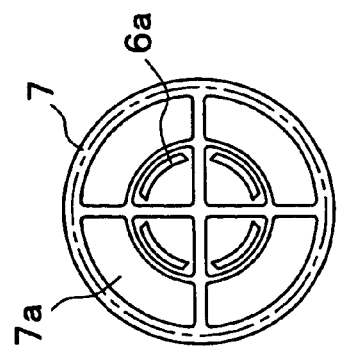
FIG. 2A
FIG. 2B

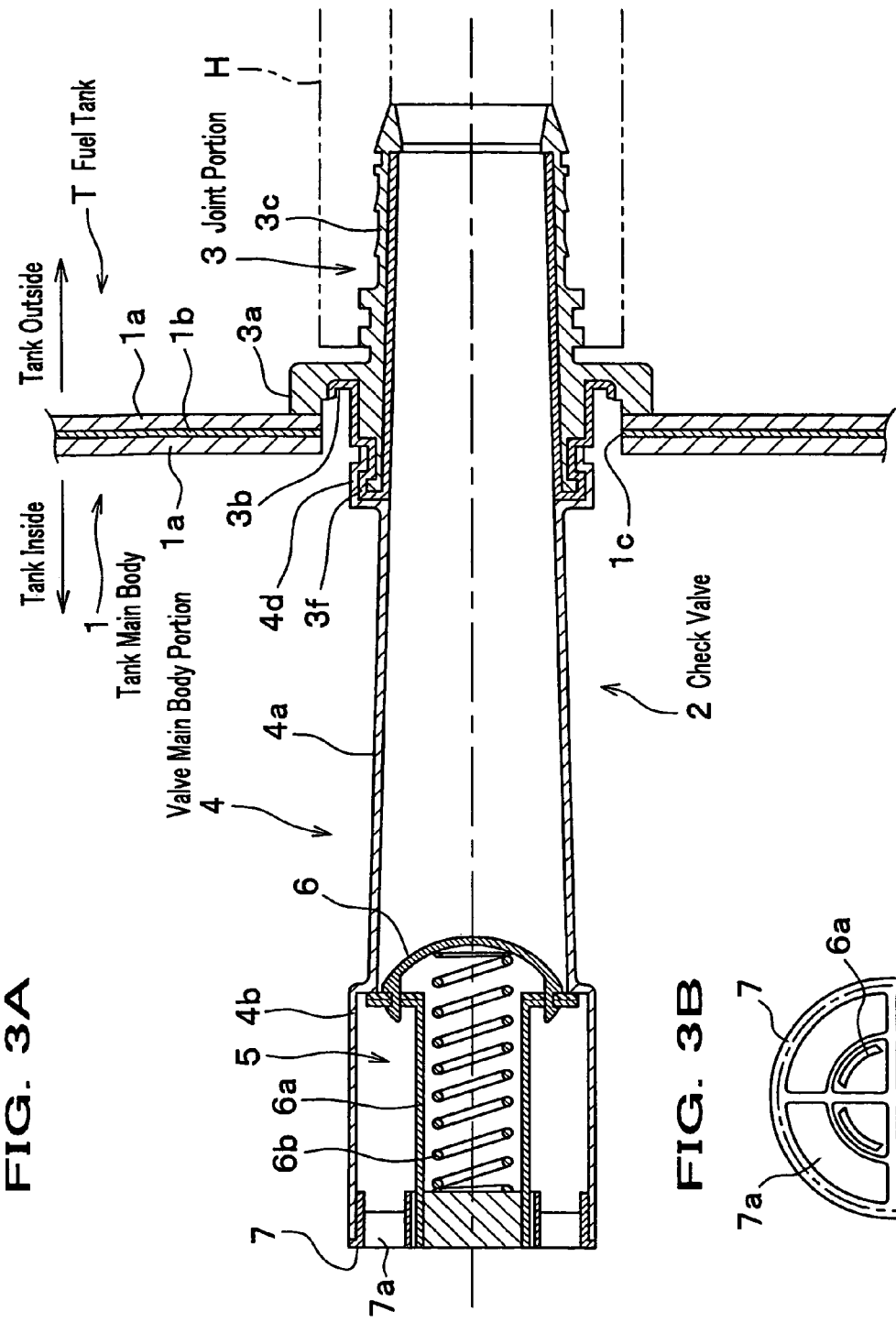
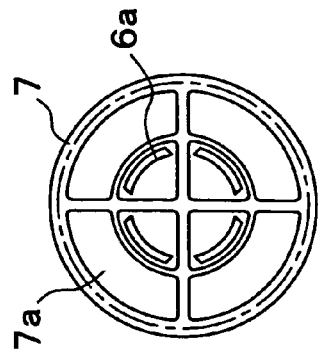
FIG. 3A
FIG. 3B

ATTACHMENT STRUCTURE OF A COMPONENT IN A FUEL TANK MADE OF RESIN

BACKGROUND OF THE INVENTION

1. Field of the Invention

The present invention relates to a fuel tank made of resin mounted on an automobile and the like.

2. Description of the Related Art

In a fuel tank mounted on an automobile a tank made of resin by a blow molding in these years becomes a main flow from a viewpoint such as anti-rust and weight saving. Usually, to the fuel tank are attached various components such as a vent valve for leading out a fuel-vapor gas in a space over a liquid surface out of the tank and keeping a tank inside pressure constant, a check valve connected to a filler tube, and a fuel pump; and in a case of a fuel tank made of resin it is desirable that the components are connected with a tank main body by a thermal deposition from a viewpoint of a simplification of a manufacturing process.

FIG. 4 is a partial section drawing showing an attachment structure of a component in a conventional fuel tank made of resin. A symbol 24 shows a tank main body of the fuel tank made of resin, a component 31 is attached to a through hole drilled in a housing wall of the tank main body 24. In FIG. 4 the component 31 is shown as a check valve and is equipped with a joint portion 32 having a flange 36 connected with an outer surface of the tank main body 24, and a tubular valve main body portion 33 provided with a valve mechanism 40 at a top end thereof. Upon forming a primary molding portion 37 formed of a material, which can be deposited, on the tank main body 24 and a hole 39 where a melting resin material is passable, the joint portion 32 has a secondary molding portion 38 consisting of an HC (hydrocarbon) barrier material layer formed by a two-color molding method on a part of an inner periphery of the flange 36. An HC barrier material is generally a non deposition member.

On the other hand, a housing of the valve main body portion 33 is formed of the non deposition member such as POM (Polyoxymethylene, polyacetal resin). The valve main body portion 33 is engaged in the joint portion 32, and an O-ring 52 is provided at a part of an engagement face thereof. The O-ring 52 is something for ensuring air tightness between inside and outside of the tank. Usually, in a fuel tank is provided a breather opening (not shown) as an air breather in filling oil, and it is designed that an air breathing within the fuel tank is basically performed only through the breather opening. Accordingly, if a gap exists between the joint portion 32 and the valve main body portion 33, there is a possibility of an air leak from the gap; the O-ring 52 is something provided for preventing the air leak.

Now then, because in the component 31 an outside of the flange 36 is formed as the primary molding portion 37, the outside of the flange 36 is connected with the tank main body 24 by a thermal deposition at an outer wall side of the tank main body 24. Because an inside portion of the flange 36 fronting an inside of the tank main body 24 is formed of the secondary molding portion 38 consisting of the HC barrier layer, a permeation of HC (hydrocarbon) to an outside of the tank is suppressed by the secondary molding portion 38. The structure thus described is disclosed, for example, in FIG. 1 and paragraph [0022] of Japanese Patent Laid-Open Publication No. 2003-2074.

Because in the conventional component 31 connection portions with the joint portion 32 and the valve main body portion 33 are formed by a non deposition member, respectively, these cannot be connected by a thermal deposition, and therefore, the structure is designed so that a gap between the both is sealed by the O-ring 52, upon engaging the valve main body portion 33 in the joint portion 32 as described above. However, the structure of making the O-ring 52 intervene results in causing an increase of a component number and a lowering of a build efficiency.

Consequently is strongly requested an attachment structure of a fuel tank made of resin for improving a seal property and satisfying strength, rigidity, and a high barrier property without making a seal member such as an O-ring intervene.

SUMMARY OF THE INVENTION

In order to solve the above problem, the present invention is an attachment structure of a component of a tank main body made of resin where a connection portion with a tank main body made of resin is formed of a thermally depositable material and which tank main body comprises a joint portion for connecting the tank main body by a thermal deposition and an inner tubular member supported by the joint portion and housed in the tank main body, wherein a movement regulation mechanism for regulating a movement in an axial direction of the inner tubular member for the joint portion is provided at least at one of the joint portion and the inner tubular member, and the joint portion and the inner tubular member are formed by an integral molding.

In accordance with the structure a seal property can be improved and strength, rigidity, and a high barrier property can be satisfied without additionally making a seal member such as an O-ring intervene.

BRIEF DESCRIPTION OF THE DRAWINGS

FIGS. 2A and 2B are enlargement drawings showing a check valve shown in FIG. 1; FIG. 2A is a section illustration; and FIG. 2B is a front view seen from a tank inside.

FIGS. 3A and 3B are illustrations related to a second embodiment of the present invention; FIG. 2A is a section illustration; and FIG. 2B is a front view seen from a tank inside.

DESCRIPTION OF THE PREFERRED EMBODIMENTS

In embodiments below will be described a case that a fuel tank made of resin is assumed a fuel tank mounted in an automobile, and that a component of an attachment object is assumed a check valve connected to a filler tube for filling oil.

FIRST EMBODIMENT

Figure 1:
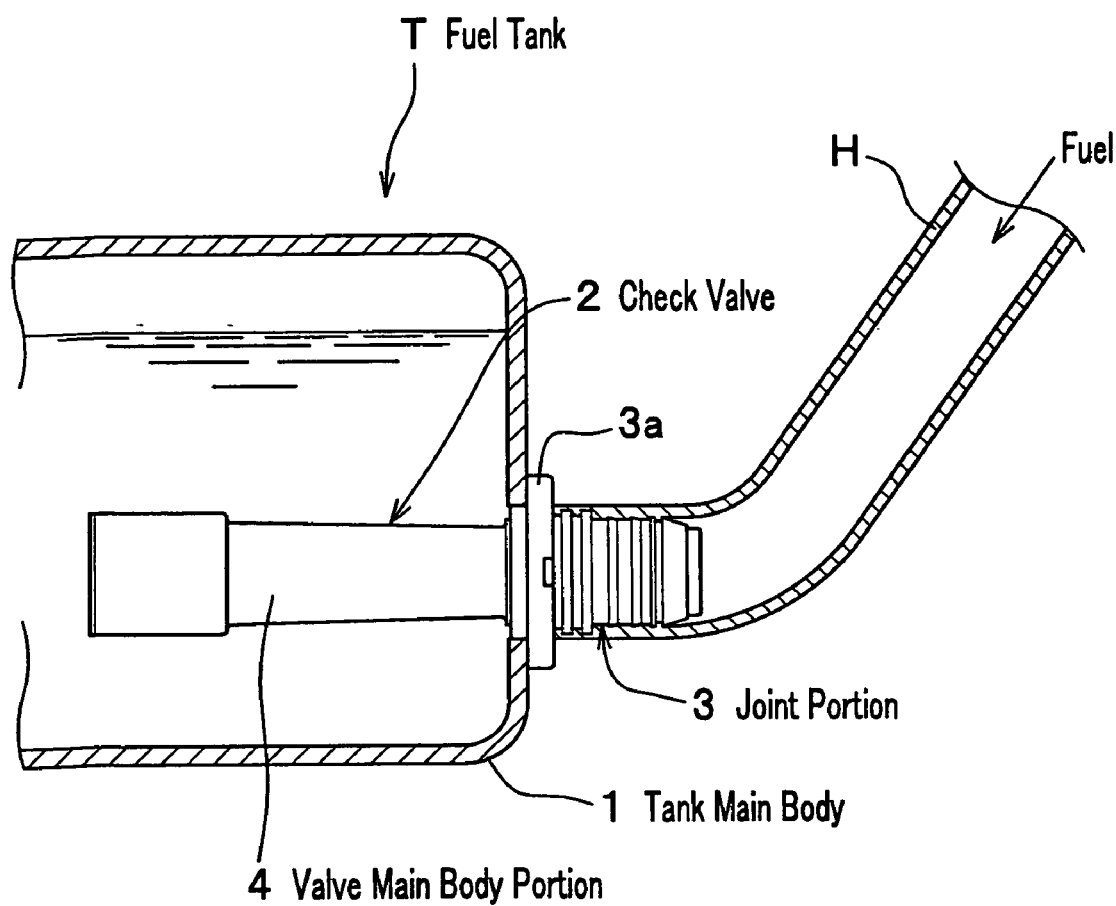
FIG. 1 is a section drawing showing an outline of an attachment structure of a component of a fuel tank made of resin related to an embodiment of the present invention.
Figure 4:
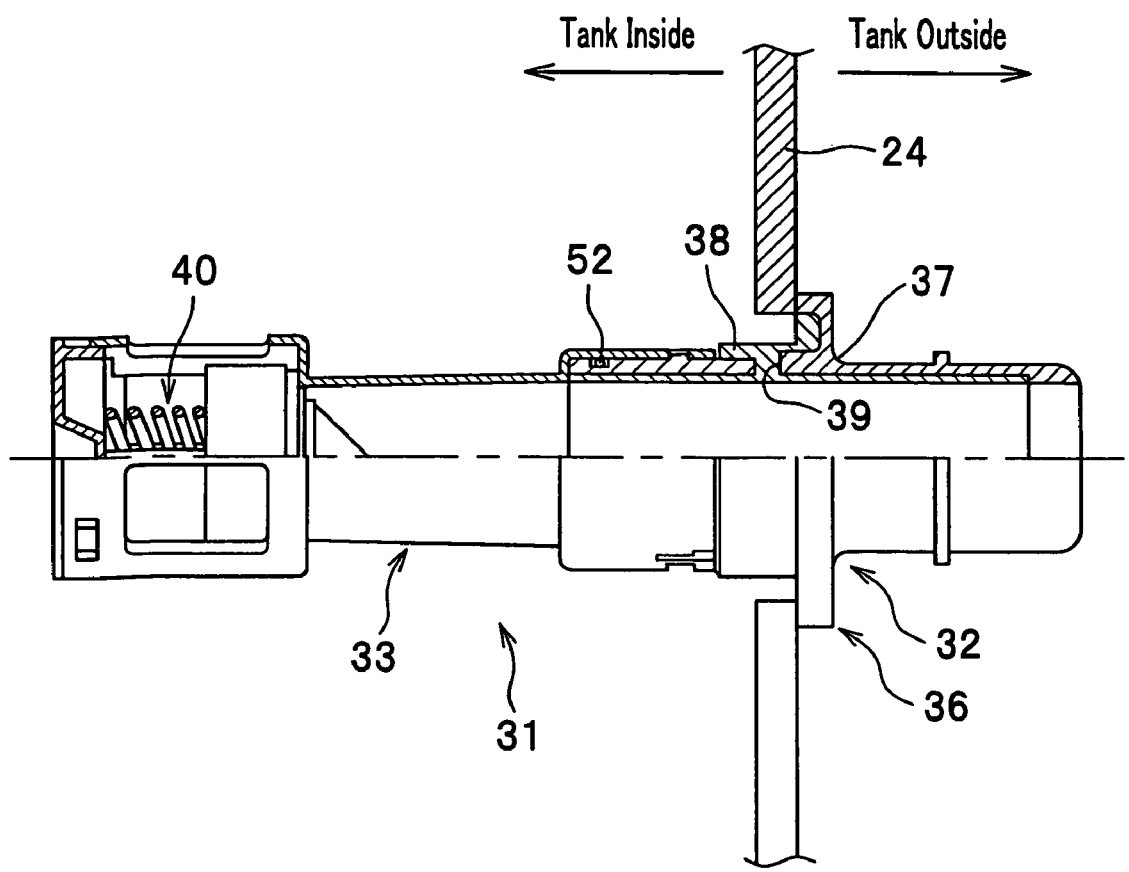
FIG. 4 is a partial section illustration showing a conventional attachment structure of a check valve.

FIG. 1 is a section drawing showing an outline of an attachment structure of a component (check valve 2) related to an embodiment of the present invention. FIGS. 2A and 2B are enlargement drawings showing the check valve shown in FIG. 1; FIG. 2A is a section illustration; and FIG. 2B is a front view seen from a tank inside. In these drawings a fuel tank T comprises a tank main body 1 made of resin for reserving fuel, and to a side face of the tank main body 1 is attached the check valve 2 for preventing backflow of the fuel. The check valve 2 comprises a joint portion 3 attached to an outer peripheral edge portion of a through hole 1c formed on the side face of the tank main body 1, and an inner tubular member of a cylindrical form (valve main body portion 4) supported by the joint portion 3 and inserted (housed) inside the tank main body 1. The tank main body 1 is designed to be a section shape where, for example, an HC barrier layer 1b consisting of EVOH (ethylene-vinylalcohol copolymer) excellent in non permeability of HC (hydrocarbon) and the like is sandwiched with thermally depositable layers 1a consisting of a thermally depositable material, for example, such as PE (polyethylene) and the like.

The joint portion 3 consists of a form having a flange portion 3a attached by a thermal deposition to the outer peripheral edge portion of the through hole 1c and a tube connection pipe portion 3c formed toward a tank outside from the flange portion 3a and fitted outside by a filler tube H. A region of the flange portion 3a and the tube connection pipe portion 3c fronting the outside of the tank main body 1 are formed of a thermally depositable material, for example, such as PE (polyethylene) and the like.

A region continuously formed across a face side fronting the inside of the tank main body 1 in the flange portion 3a and an inner peripheral face of the tube connection pipe portion 3c is formed as an HC barrier layer 3b consisting of EVOH (ethylene-vinylalcohol copolymer) excellent in non permeability of HC (hydrocarbon) and the like. The HC barrier layer 3b, the flange portion 3a formed by the PE (polyethylene) and the like, and the region of the tube connection pipe portion 3c fronting the outside of the tank main body 1 are formed by a two-color molding, respectively, and thereby integrally configures the joint portion 3.

A housing of the valve main body portion 4 consists of a form comprising a cylindrical tube middle portion 4a gradually diminishing in diameter toward a side connected with the joint portion 3, and a valve housing middle portion 4b for housing a valve mechanism 5; and in the embodiment the housing is formed of a non deposition member such as POM (Polyoxymethylene, polyacetal resin). The valve mechanism 5 is configured as a backflow prevention mechanism 6 for preventing backflow of fuel into a side of the filler tube H from a side of the tank main body 1, comprises a sliding-in-contact portion 6a and a spring 6b, and these members are fixed at the valve housing middle portion 4b by a valve fixation portion 7. Meanwhile, at the valve fixation portion 7 is provided an insertion opening 7a, and through the insertion opening 7a is supplied fuel inside the tank main body 1.

And now the present invention is mainly characterized in that when connecting the joint portion 3 with the valve main body portion 4, a movement regulation mechanism for regulating a movement in an axial direction of the valve main body portion 4 for the joint portion 3 is provided at least at one of the joint portion 3 and the valve main body portion 4, and that they are formed as an integral molding. As the integral molding is economical a molding by a metal mold, specifically an insert molding; and in the embodiment a whole housing of the check valve 2 is integrally formed by inserting POM (Polyoxymethylene, polyacetal resin) for the joint portion 3 formed by a two-color molding.

The movement regulation mechanism is designed to be a mode that: on an inner peripheral face of a vicinity of an end portion of the tube connection pipe portion 3c is provided an annular protrusion portion 3e so as to cut into an outer periphery of the tube middle portion 4a; and a protrusion 4c formed on an outer periphery of the tube middle portion 4a is bumped to an end face 3d of the HC barrier material layer 3b fronting the inside of the tank main body 1. Thus, in the valve main body portion 4 a movement thereof in the axial direction is surely regulated for the joint portion 3, and the valve main body portion 4 and the joint portion 3 are integrally formed, respectively, by an insert molding as described above.

In accordance with the present invention, because the check valve 2 is integrally manufactured, it becomes unnecessary to build the joint portion 3 and the valve main body portion 4, and a build efficiency of a whole unit of the fuel tank made of resin results in being improved. In addition, because the joint portion 3 and the valve main body portion 4 are integrally solidly connected, a jolt is reduced, and thus a build accuracy for the tank main body 1 is improved.

Furthermore, because by forming the joint portion 3 and the valve main body portion 4 as an integral molding with a metal mold, specifically by forming them with an insert mold, a seal property between the both is ensured, it becomes unnecessary to make a seal member such as an O-ring and the like intervene as a conventional attachment structure of a fuel tank made of resin. Accordingly, because a number of components can be reduced, and it also becomes unnecessary to build the O-ring and the like, the build efficiency of the whole unit of the fuel tank made of resin results in being improved from this point, too. In addition, because a seal area can be largely ensured, compared to a case of the O-ring, a seal performance is improved, compared to that of a conventional attachment structure of a fuel tank made of resin.

SECOND EMBODIMENT

Next will be described a second embodiment of the present invention. FIGS. 3A and 3B are enlargement section drawings illustrating a second embodiment. Meanwhile, in the second embodiment a same symbol is added for a same element as in the first embodiment, and a description thereof is omitted. A point of the second embodiment different from the first embodiment exists in a concrete form related to the movement regulation mechanism. Although the first embodiment is designed to be a mode that the annular protrusion 3e is provided so as to cut into the outer periphery of the tube middle portion 4a at the side of the tube connection pipe portion 3c and to bump the tube connection pipe portion 4c, which is annularly formed at the outer periphery of the tube middle portion 4a, to the end face 3d of the HC barrier material layer 3b fronting the inside of the tank main body 1, the second embodiment is designed to be a mode that a claw portion 4d like a hook is formed at an end portion of the tube middle portion 4a of the valve main body portion 4, and that the claw portion 4d is fitted outside an end portion 3f of the HC barrier material layer 3b fronting the inside of the tank main body 1.

Also in accordance with the structure, the movement of the valve main body portion 4 in the axial direction is surely regulated for the joint portion 3, and the joint portion 3 and the valve main body portion 4 are integrally formed, respectively, by an insert molding. Also in accordance with the embodiment, the seal property between the joint portion 3 and the valve main body portion 4 results in being ensured, it becomes unnecessary to make a seal member such as an O-ring and the like intervene as a conventional attachment structure of a fuel tank made of resin. Accordingly, because a number of components can be reduced, and it also becomes unnecessary to build the O-ring and the like, the build efficiency of the whole unit of the fuel tank made of resin results in being improved from this point, too.

Thus, although the preferred embodiments are described, the present invention is not limited thereto, and appropriate variations are available without departing from the spirit and scope of the invention. For example, although in the embodiments a fuel tank of an automobile is described, the present invention is not limited thereto and, for example, is also applicable to a fuel tank mounted on a ship and the like.

What is claimed is:

1. An attachment structure of a component in a fuel tank made of resin, the structure comprising:
    a movement regulation mechanism to regulate movement in two axial directions of an inner tubular member relative to a joint portion, the movement regulation mechanism provided at least at one of the joint portion or the inner tubular member,
    wherein said joint portion and said inner tubular member are formed by an integral molding,
    wherein a connection portion with a tank main body made of the resin is formed of a thermally depositable material, and
    wherein said fuel tank made of the resin comprises said joint portion connected with the tank main body by a thermal deposition and said inner tubular member supported by said joint portion and housed in said tank main body.

2. The attachment structure of claim 1 wherein,
    the joint portion has a first protrusion that extends inward;
    the inner tubular member is adapted to pass at least partially through the joint portion; and
    the inner tubular member has a notch on its peripheral surface adapted to receive the first protrusion to regulate movement in two axial directions of the inner tubular member relative to the joint portion.

3. The attachment structure of claim 2 wherein the first protrusion and the notch are annular.

4. The attachment structure of claim 2 further comprising a hydrocarbon barrier layer positioned between a portion of the joint portion and a portion of the inner tubular member.

5. The attachment structure of claim 2 further comprising a second protrusion formed on an outer peripheral surface of the inner tubular member and adapted to contact an end face of the hydrocarbon barrier layer that is in contact with an end face of the joint portion.

6. The attachment structure of claim 5 wherein the second protrusion is annular.

7. The attachment structure of claim 5 wherein the first and second protrusions are adapted to cooperatively prevent the inner tubular member from moving in an axial direction with respect to the joint portion.

8. The attachment structure of claim 1 further comprising a pipe connecting portion formed at an outer peripheral surface of the joint portion and adapted to mate with a tank filler tube.

9. The attachment structure of claim 1 wherein the joint portion is attached to the fuel tank by thermal deposition.

10. The attachment structure of claim 1 wherein,
    the joint portion has an end with a protrusion that extends outward;
    the inner tubular member has a claw at an end thereof, and
    the claw is adapted to grip the protrusion on the joint portion to regulate axial movement of the inner tubular member relative to the joint portion.

11. The attachment structure of claim 10 wherein the protrusion and the claw are annularly shaped.

12. The attachment structure of claim 10 further comprising a hydrocarbon barrier layer positioned at least between the claw and the protrusion.

13. The attachment structure of claim 10 further comprising a pipe connecting portion formed at an outer peripheral surface of the joint portion and adapted to mate with a tank filler tube.

14. The attachment structure of claim 10 wherein the joint portion is adapted to be attached to the fuel tank by thermal deposition.

* * * * *